(12) United States Patent
Goto et al.

(10) Patent No.: US 6,935,452 B2
(45) Date of Patent: Aug. 30, 2005

(54) TWO-WHEEL/FOUR-WHEEL DRIVE SWITCHING DEVICE FOR VEHICLE

(75) Inventors: Shinji Goto, Saitama (JP); Akio Senda, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 55 days.

(21) Appl. No.: 10/385,757

(22) Filed: Mar. 12, 2003

(65) Prior Publication Data

US 2004/0003953 A1 Jan. 8, 2004

(30) Foreign Application Priority Data

Mar. 19, 2002 (JP) ........................................ 2002-076730

(51) Int. Cl.[7] .............................................. B60K 17/34
(52) U.S. Cl. .......................... 180/233; 192/44; 701/69
(58) Field of Search ................................ 180/233, 247, 180/248; 192/135, 222, 48, 92, 44; 701/69, 89

(56) References Cited

U.S. PATENT DOCUMENTS

| | | | | |
|---|---|---|---|---|
| 5,172,787 A | * | 12/1992 | Kobayashi | ................ 180/197 |
| 5,492,194 A | * | 2/1996 | McGinn et al. | ............. 180/233 |
| 5,924,510 A | * | 7/1999 | Itoh et al. | ................... 180/197 |
| 6,335,599 B1 | * | 1/2002 | Nonaka et al. | ............. 318/430 |

FOREIGN PATENT DOCUMENTS

JP        8-216714         8/1996

* cited by examiner

*Primary Examiner*—Ann Marie Boehler
(74) *Attorney, Agent, or Firm*—Birch, Stewart, Kolasch & Birch, LLP

(57) ABSTRACT

The two-wheel/four-wheel drive switching device including a switching unit provided in either a power transmitting mechanism interposed between an engine and front wheels or a power transmitting mechanism interposed between the engine and rear wheels for switching between the continuation and interruption of power transmission in the power transmitting mechanism, and a control unit for controlling the switching unit. The control unit detects a drive current supplied to the switching unit and performs variable duty control to maintain the drive current at a given value. As a result, the two-wheel/four-wheel drive switching device reduces the generation of noise and greatly suppresses the consumption of power.

12 Claims, 10 Drawing Sheets

ELCTROMAGNETIC CLUTCH IS OFF

ELECTROMAGNETIC CLUTCH IS ON

TWO-WHEEL/FOUR-WHEEL DRIVE SWITCHING DEVICE FOR VEHICLE

CROSS-REFERENCE TO RELATED APPLICATION

The present application claims priority under 35 U.S.C. §119 to Japanese Patent Application No. 2002-076730, filed on Mar. 19, 2002, the entire contents of which are hereby incorporated by reference.

BACKGROUND OF THE INVENTION

1. Field of the Invention

The present invention relates to a two-wheel/four-wheel drive switching device for a vehicle.

2. Description of Background Art

A vehicle capable of switching between a two-wheel drive mode and a four-wheel drive mode is known in the art.

FIGS. 4 and 5 show an example of such a vehicle. In FIGS. 4 and 5, vehicle 1 is composed generally of a body frame 3, an engine 2 mounted on the body frame 3 at its longitudinally central position, a pair of front wheels 4 provided at a front portion of the body frame 3, and a pair of rear wheels 5 provided at a rear portion of the body frame 3. Further, a steering handle 6 is provided at a front upper portion of the body frame 3 for steering the front wheels 4, a fuel tank 7 mounted on the body frame 3 at a position above the engine 2, and a seat 8 is mounted on the body frame 3 at a position behind the fuel tank 7.

As shown in FIG. 5, the front wheels 4 are vertically movably supported by a pair of front suspensions 9 mounted on the body frame 3 at its front side portions, and the rear wheels 5 are also vertically movably supported by a pair of rear suspensions 10 mounted on the body frame 3 at its rear side portions.

A final reduction gear unit 13 for the front wheels 4 is provided at a front central portion of the body frame 3 and connected through a propeller shaft 11 to the engine 2. In a similar manner, a final reduction gear unit 14 for the rear wheels 5 is provided at a rear central portion of the body frame 3 and connected through a propeller shaft 12 to the engine 2. The front wheels 4 are connected to the final reduction gear unit 13, and the rear wheels 5 are connected to the final reduction gear unit 14.

As shown in FIG. 5, a two-wheel/four-wheel drive switching device 15 for switching between the continuation and interruption of power transmission to the front wheels 4 to thereby switch between a rear-wheel drive mode and a four-wheel drive mode is provided between the final reduction gear unit 13 and the propeller shaft 11.

Alternatively, the two-wheel/four-wheel drive switching device 15 may be provided between the propeller shaft 12 and the final reduction gear unit 14 to switch between a front-wheel drive mode and a four-wheel drive mode.

Such two-wheel/four-wheel drive mode switching is carried out based on a road condition or a running condition, for example.

FIG. 9 shows an example of a conventional two-wheel/four-wheel drive switching device 15.

The two-wheel/four-wheel drive switching device 15 shown in FIG. 9 has an input shaft 16 connected to the final reduction gear unit 13. The input shaft 16 is axially divided into two input shaft components 16a and 16b aligned and butted together. The device 15 further includes a switching unit 17 for switching between the connection and disconnection of the input shaft components 16a and 16b.

In more detail, a cylindrical positioning projection 18 is formed centrally on an end surface of the input shaft component 16a located on the final reduction gear unit 13 side, and a positioning recess 19 is formed centrally on an end surface of the input shaft component 16b located on the engine 2 side. The positioning projection 18 of the input shaft component 16a is rotatably engaged with the positioning recess 19 of the input shaft component 16b. Accordingly, the two input shaft components 16a and 16b are butted together so that the positioning projection 18 and the positioning recess 19 are engaged with each other, thereby making an alignment of the input shaft components 16a and 16b and a relatively rotatable connection therebetween.

Further, a spline S1 is formed on the outer circumferential surface of the input shaft component 16a near its butted end surface, and a spline S2 is formed on the outer circumferential surface of the input shaft component 16b near its butted end surface. The switching unit 17 is provided so as to surround the splines S1 and S2 of the input shaft components 16a and 16b.

The switching unit 17 is composed of a switching ring 20 having an internal spline slidably meshing with the splines S1 and S2, and a driving mechanism 21 configured by a solenoid for sliding the switching ring 20 in the axial direction of the input shaft components 16a and 16b to select a first position where the internal spline of the switching ring 20 meshes with only the spline S1 of the input shaft component 16a or a second position where the internal spline of the switching unit 20 meshes with both the splines S1 and S2 of the input shaft components 16a and 16b.

In operation, when the switching ring 20 is axially moved in one direction by the driving mechanism 21 to engage with only the input shaft component 16a, the transmission of power from the engine 2 to the front wheels 4 is interrupted to thereby obtain a two-wheel drive mode where only the rear wheels 5 are driven. On the other hand, when the switching ring 20 is axially moved in the other direction from the above condition by the driving mechanism 21 to engage with both the input shaft components 16a and 16b, the input shaft components 16a and 16b are connected together to transmit the engine power also to the front wheels 4, thereby obtaining a four-wheel drive mode where both the front wheels 4 and the rear wheels 5 are simultaneously driven.

As described in Japanese Patent Laid-open No. Hei 8-216714, the two-wheel/four-wheel drive switching device 15 is maintained in an energized condition in the four-wheel drive mode.

As shown in FIG. 10, the supply of a drive current to the two-wheel/four-wheel drive switching device 15 is kept stopped in the two-wheel drive mode, and the drive current is continuously supplied to the device 15 in the four-wheel drive mode.

In the conventional two-wheel/four-wheel drive switching device 15 mentioned above, the following problems to be solved remain.

If there is any difference in peripheral speed between the front wheels 4 and the rear wheels 5 in switching the drive mode, the spline of the switching ring 20 does not mesh effectively with the spline S2 of the input shaft component 16b, causing a problem that the two-wheel drive mode cannot be switched to the four-wheel drive mode.

Even though the drive mode switching is effected, the splines of the switching ring 20 and the input shaft component 16b strike each other to cause the generation of noise.

To solve these problems, it is necessary to provide a mechanism for synchronizing (aligning) the splines of the switching ring 20 and the input shaft component 16b, causing complication of the structure. Further, in mounting the two-wheel/four-wheel drive switching device 15, the structure of any member at a mounting position must be substantially modified from the existing structure.

Further, in the technique described in Japanese Patent Laid-open No. Hei 8-216714 mentioned above, a drive current is continuously supplied to the two-wheel/four-wheel drive switching device 15 in the four-wheel drive mode, causing an increase in power consumption, which becomes a heavy burden for a small-sized vehicle.

SUMMARY AND OBJECT OF THE INVENTION

Accordingly, it is an object of the present invention to provide a two-wheel/four-wheel drive switching device for a vehicle which can reduce the generation of noise and can greatly suppress the power consumption.

According to a first aspect of the present invention, a two-wheel/four-wheel drive switching device for a vehicle includes a switching unit provided in either a power transmitting mechanism interposed between an engine and front wheels, or a power transmitting mechanism interposed between the engine and rear wheels for switching between the continuation and interruption of power transmission in the power transmitting mechanism. Also included is a control unit for controlling the switching unit. The control unit detects a drive current supplied to the switching unit and performs variable duty control to maintain the drive current at a given value.

According to a second aspect of the present invention, a two-wheel/four-wheel drive switching device for a vehicle includes a switching unit provided in either a power transmitting mechanism interposed between an engine and front wheels, or a power transmitting mechanism interposed between the engine and rear wheels for switching between the continuation and interruption of power transmission in the power transmitting mechanism. Also included is a control unit for controlling the switching unit. The control unit detects a drive current supplied to the switching unit and controls a voltage applied to the switching unit to maintain the drive current at a given value.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

A preferred embodiment of the present invention will now be described with reference to FIGS. 1 to 3, and 6 to 8.

Figure 4:
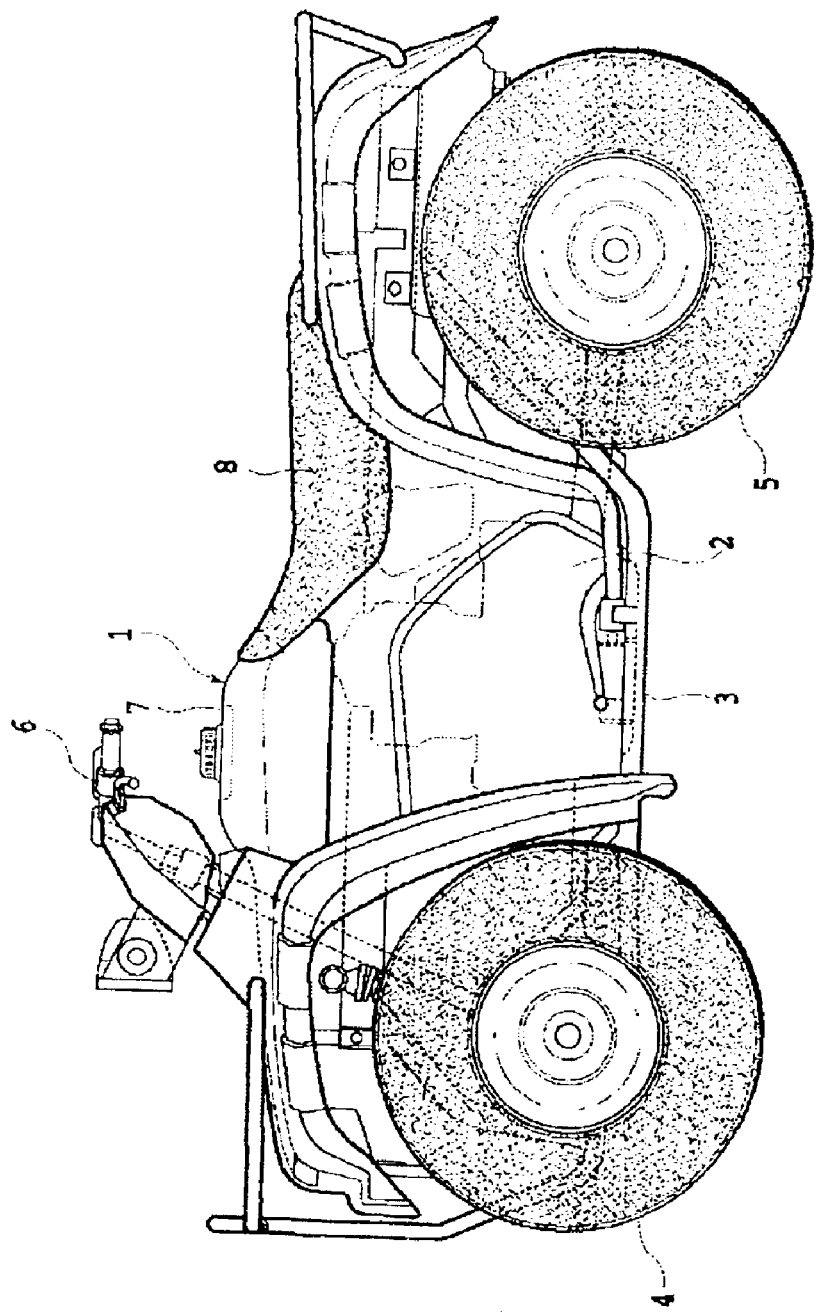
FIG. 4 is a side view of a vehicle having a two-wheel/four-wheel drive switching device.
Figure 5:
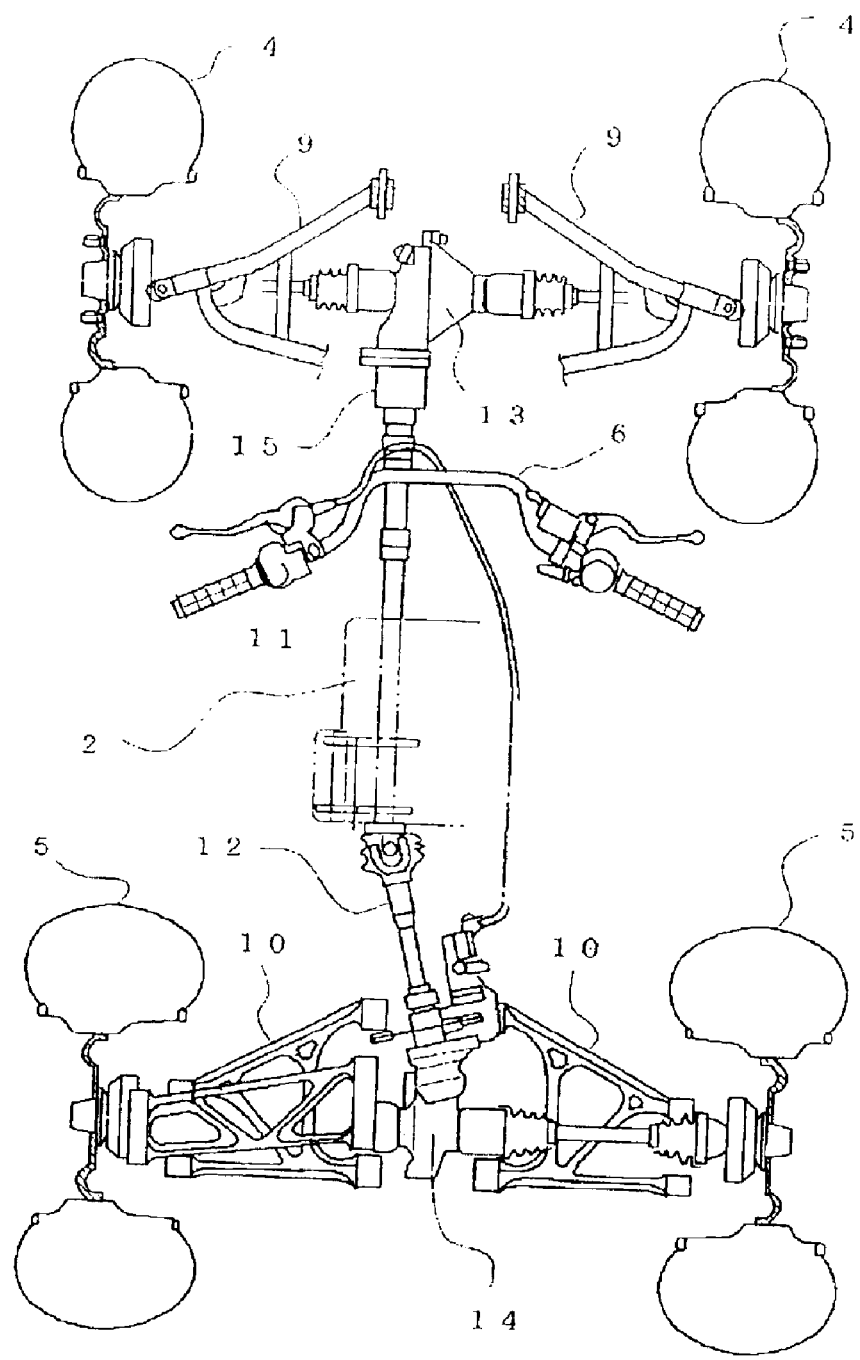
FIG. 5 is a plan view for illustrating a body configuration of the vehicle shown in FIG. 4.
Figure 6:
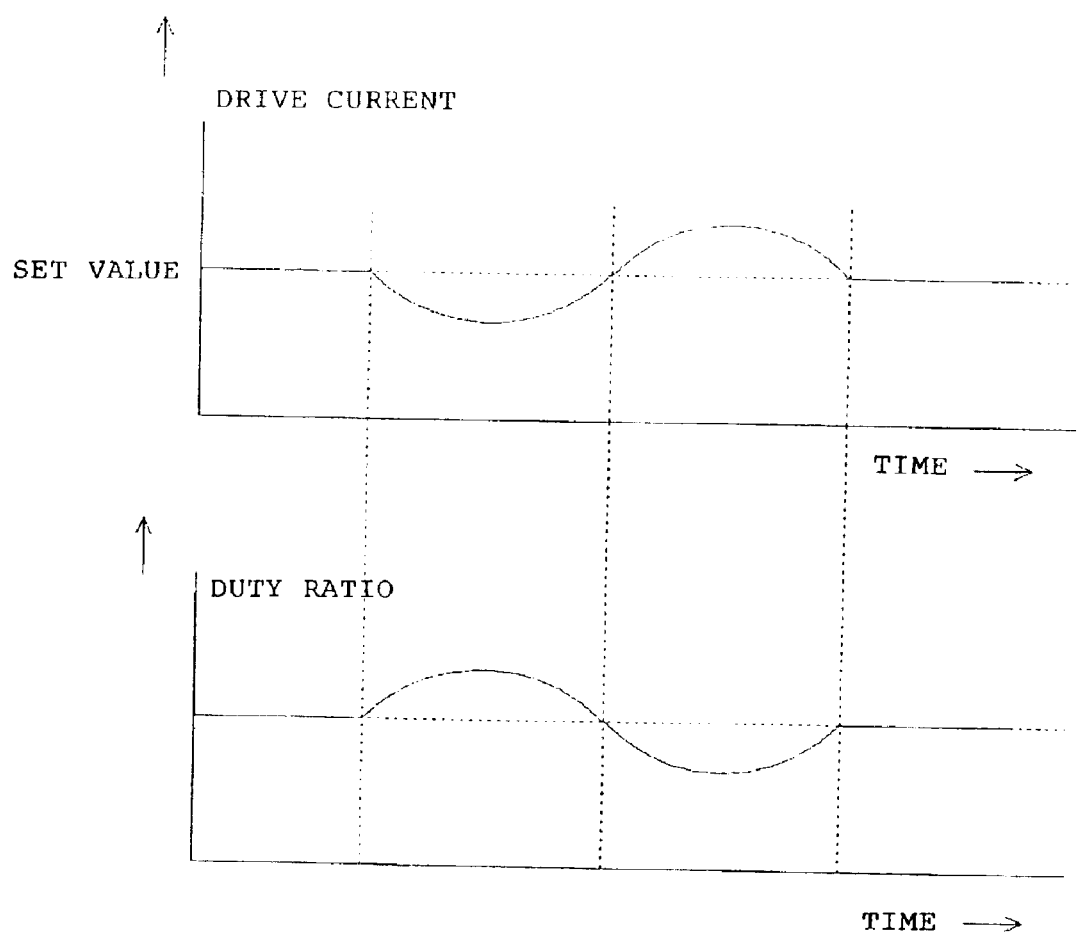
FIG. 6 is a waveform chart of a drive current supplied to a switching mechanism according to the preferred embodiment.

In the following description, main parts of a vehicle to which the present invention is applied are common to those shown in FIGS. 4 and 5, so the same reference numerals as those shown in FIGS. 4 and 5 are used for simplicity of illustration.

Figure 1:
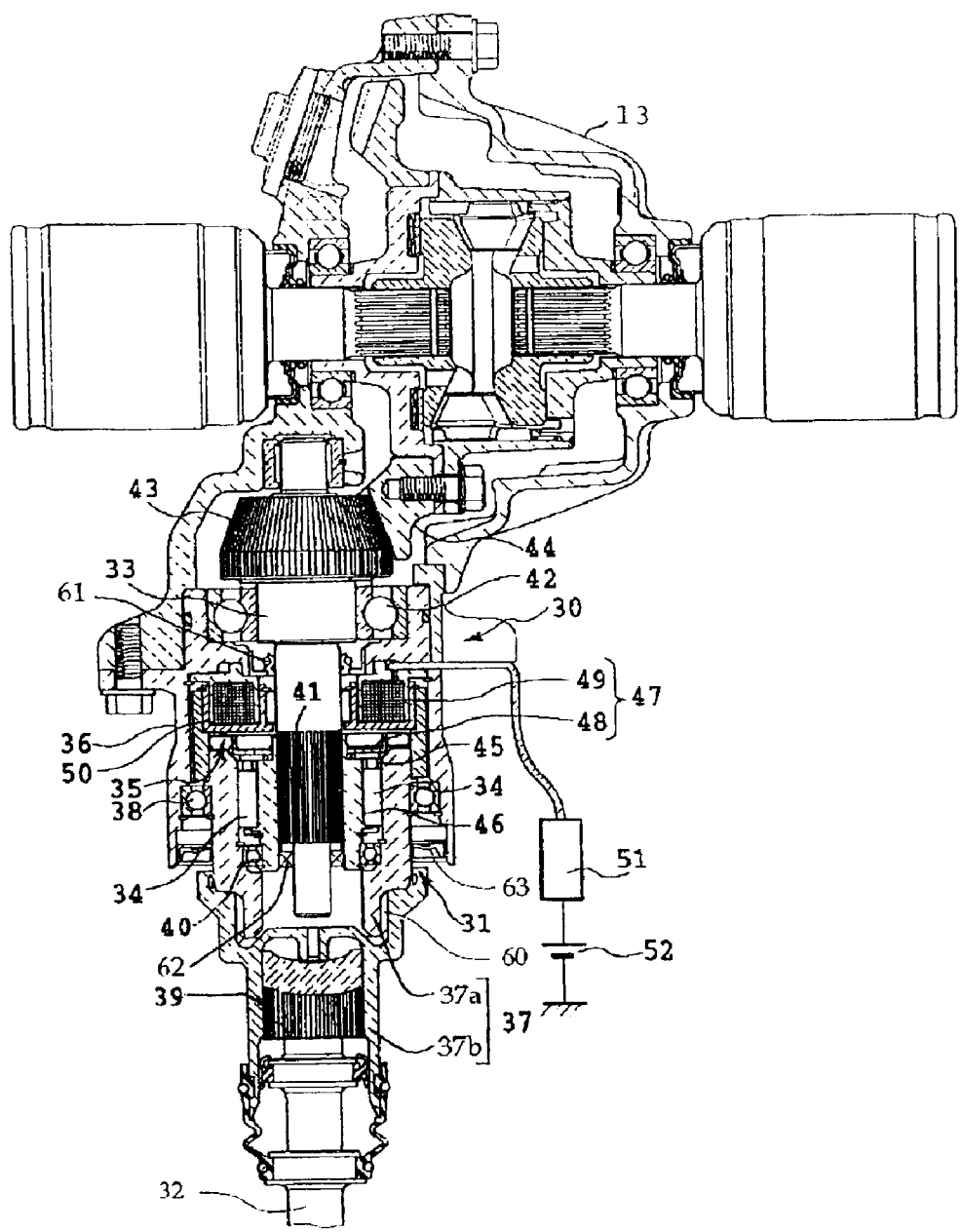
FIG. 1 is a sectional view showing a preferred embodiment of the present invention.

Referring to FIG. 1, a two-wheel/four-wheel drive switching device (which will be hereinafter referred to simply as drive switching device) 30 according to this preferred embodiment is provided in a power transmitting mechanism interposed between front wheels 4 and an engine 2. The drive switching device 30 includes a switching unit 31 for switching between the continuation and interruption of power transmission in the power transmitting mechanism. The switching unit 31 is composed generally of a drive shaft 32 connected to the engine 2, a driven shaft 33 engaged with the drive shaft 32 with an annular space defined therebetween, a plurality of engaging members 34 located in this annular space between the drive shaft 32 and the driven shaft 33 so as to disengageably engage the opposed surfaces of the drive shaft 32 and the driven shaft 33, thereby connecting and disconnecting the drive shaft 32 and the driven shaft 33, a switching mechanism 35 for selectively moving the engaging members 34 between a position where the drive shaft 32 and the driven shaft 33 are connected with each other and a position where the drive shaft 32 and the driven shaft 33 are disconnected from each other, and a casing 36 for surrounding these members.

In more detail, a cylindrical outer ring 37 is rotatably mounted in the casing 36 through a bearing 38 so as to axially project from the casing 36 toward the engine 2.

The outer ring 37 is axially divided into two parts, i.e., a first outer ring 37a and a second outer ring 37b. The first and second outer rings 37a and 37b are formed with splines 60 at their joint end portions and they are connected together through the splines 60 so as to be rotatable integrally.

Further, the inner circumferential surface of the second outer ring 37b at its other end portion on the engine 2 side is formed with a spline 39. The drive shaft 32 is inserted in the second outer ring 37b so as to mesh with the spline 39, thereby making a connection between the drive shaft 32 and the second outer ring 37b.

A cylindrical inner ring 40 is provided inside the outer ring 37 with an annular spacing having a given width defined between the inner circumferential surface of the outer ring 37 and the outer circumferential surface of the inner ring 40.

The inner circumferential surface of the inner ring 40 is formed with a spline 41, and the driven shaft 33 inserted in the casing 36 is connected through the spline 41 to the inner ring 40.

The driven shaft 33 is rotatably supported at its axially intermediate portion by a bearing 42 mounted in the casing 36.

The driven shaft 33 is integrally formed with a bevel gear 43 at a front end portion thereof, and the bevel gear 43 is in mesh with a ring gear 44 provided in a final reduction gear unit 13 for the front wheels 4.

Figure 2:
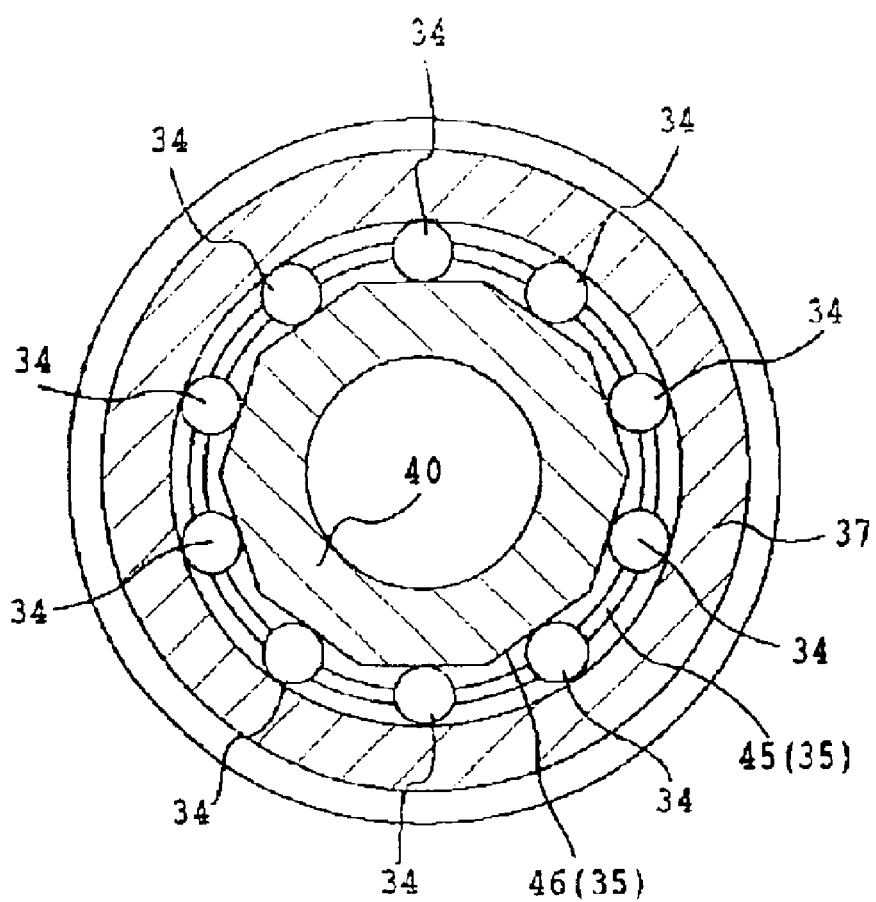
FIG. 2 is a cross section of an essential part of the preferred embodiment shown in FIG. 1.

As shown in FIGS. 1 and 2, the engaging members 34 of the switching unit 31 are provided by a plurality of rollers arranged parallel to the axis of the outer ring 37. The switching mechanism 35 is composed of a retainer 45 mounted on the outer ring 37 so as to be rotatable relative thereto (relatively movable about the axis of the outer ring 37) for rotatably retaining the engaging members 34, and a cam 46 formed on the outer circumferential surface of the inner ring 40 for radially moving the engaging members 34 in association with the relative movement of the retainer 45.

An electromagnetic clutch 47 constituting the switching mechanism 35 is provided at an end portion of the outer ring 37 located inside the casing 36, so as to engage or disengage the retainer 45 and the outer ring 37.

The electromagnetic clutch 47 is composed of a clutch plate 48 interposed between the retainer 45 and the outer ring 37 and an exciting coil 49 for operating the clutch plate 48.

The clutch plate 48 is energized by passing a current through the exciting coil 49 to thereby obtain an engaged condition. As a result, the retainer 45 and the outer ring 37 are fixedly engaged together so as not to be relatively rotatable.

The exciting coil 49 is annularly formed, and it is accommodated in an annular housing 50 forming an iron core. The housing 50 is mounted in the casing 36 so as to surround the driven shaft 33.

The outer ring 37, the inner ring 40, and the switching mechanism 35 are built into the casing 36 to form a unit. In the condition where the driven shaft 33 is mounted as shown in FIG. 1, the casing 36 is bolted to the case of the final reduction gear unit 13, thereby mounting the above unit to the final reduction gear unit 13.

Figure 7:
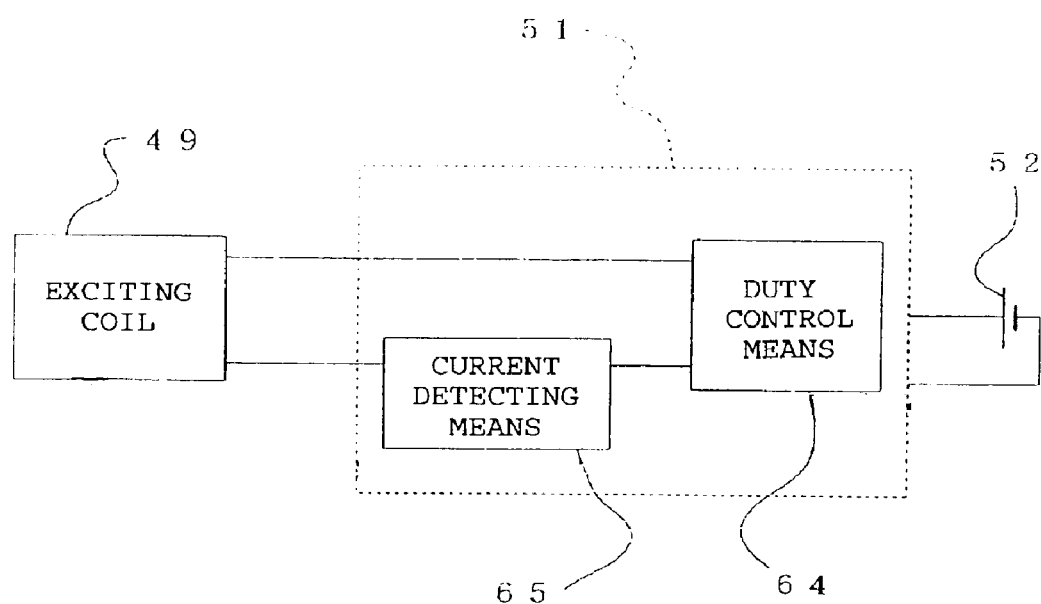
FIG. 7 is a block diagram of a control unit according to the preferred embodiment.

Further, a control unit 51 for controlling a current to be supplied to the exciting coil 49 is connected to the exciting coil 49, and a power supply 52 for supplying a driving power to the exciting coil 49 is connected to the control unit 51. As shown in FIG. 7, the control unit 51 includes duty control means 64 for controlling the drive current for the exciting coil 49 and current detecting means 65 for detecting the drive current supplied to the exciting coil 49. The duty control means 64 performs variable duty control of the drive current according to a detection signal from the current detecting means 65 so that the drive current detected becomes a set value.

As mentioned above, the variable duty control is performed so that the drive current supplied to the exciting coil 49 becomes a set value. This set value is suitably determined according to an operational condition and a loaded condition of the engine 2, for example, in such a range as to prevent that the four-wheel drive mode may be undesirably shifted to the two-wheel drive mode because of lacking of a clutch pressure.

In the case that the drive current is lower than the set value, an engagement force produced in the electromagnetic clutch 47 is weak and there is a case that the generation of noise may be caused according to an operational condition. Conversely, in the case that the drive current is higher than the set value, the temperature of the exciting coil 49 rises to cause an increase in power consumption or to cause a change in clutch pressure in the electromagnetic clutch 47, causing the generation of noise.

FIG. 1 also shows oil seals 61 and 62, and dust seal 63.

In the two-wheel/four-wheel drive switching device 30 according to this preferred embodiment mentioned above, the transmission of power from the engine 2 to the front wheels 4 is interrupted by cutting off the supply of the drive current to the exciting coil 49 to thereby cancel the engagement of the retainer 45 and the outer ring 37 effected by the electromagnetic clutch 47.

Figure 3A:
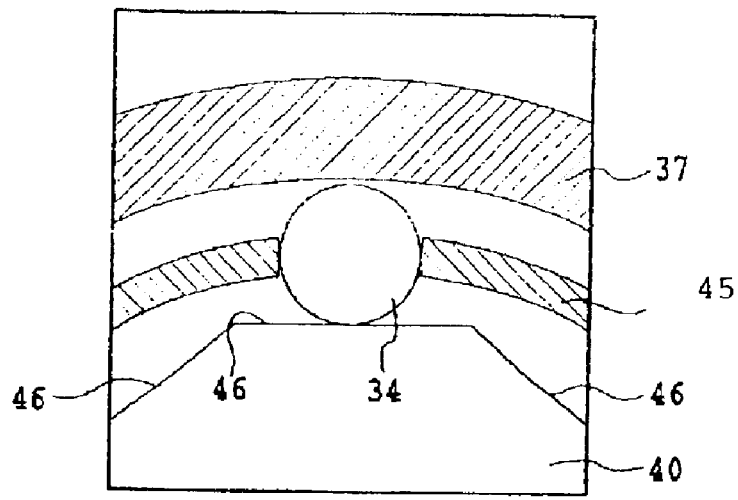
FIGS. 3a and 3b are enlarged views of a part of FIG. 2 for illustrating the operation of a drive switching device according to the preferred embodiment.

This condition is shown in FIG. 3a, wherein each engaging member 34 is placed on a bottom portion of the cam 46 and is maintained in spaced relationship with the outer ring 37.

As a result, the outer ring 37 and the inner ring 40 are disconnected from each other to thereby hinder the transmission of rotation of the drive shaft 32 to the driven shaft 33, thus stopping the drive of the front wheels 4.

On the other hand, the four-wheel drive mode is selected by supplying a drive current to the exciting coil 49 to energize the electromagnetic clutch 47, thereby engaging the retainer 45 to the outer ring 37.

Figure 3B:
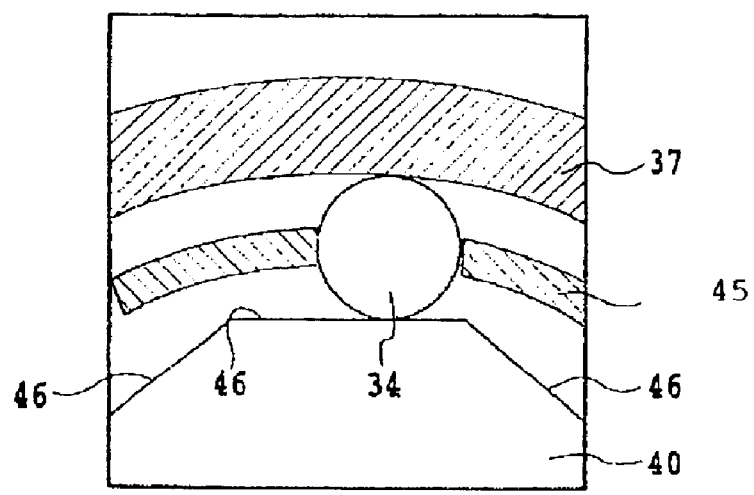

As a result, the engaging members 34 retained to the retainer 45 are moved with the outer ring 37 along the cam 46 formed on the inner ring 40 toward a top portion of the cam 46 until coming into contact with the inner surface of the outer ring 37 as shown in FIG. 3b.

Accordingly, the outer ring 37 and the inner ring 40 are connected together through the engaging members 34, and the drive shaft 32 and the driven shaft 33 are therefore connected together, thereby transmitting the rotation of the drive shaft 32 to the driven shaft 33 to start the drive of the front wheels 4.

In the drive switching device 30 as described above, the engaging members 34 are interposed between the outer ring 37 and the inner ring 40 to obtain a power transmittable condition. Accordingly, a shock noise produced in connecting the outer ring 37 and the inner ring 40 can be greatly reduced, so that the generation of noise in switching between the two-wheel drive mode and the four-wheel drive mode can be suppressed.

Further, the switching unit 31 is assembled as a unit, and it is fixed to the final reduction gear unit 13, thereby achieving simple mounting of the switching unit 31. Accordingly, the switching unit 31 can be mounted without the need for a substantial change in the existing structure.

Further, even when there is a difference in peripheral speed between the front wheels 4 and the rear wheels 5, the connection and disconnection of the drive shaft 32 and the driven shaft 33 can be made, and it is unnecessary to provide any complicated auxiliary mechanisms such as a synchronizing mechanism, thereby achieving a simple configuration.

In the case that the vehicle 1 is in the four-wheel drive mode, the drive current supplied to the switching mechanism 35 is under the variable duty control as mentioned above. Accordingly, the power consumption can be reduced as compared with the case of continuously supplying the drive current. As a result, a generator and a battery mounted on the vehicle 1 can be made compact.

Figure 8:
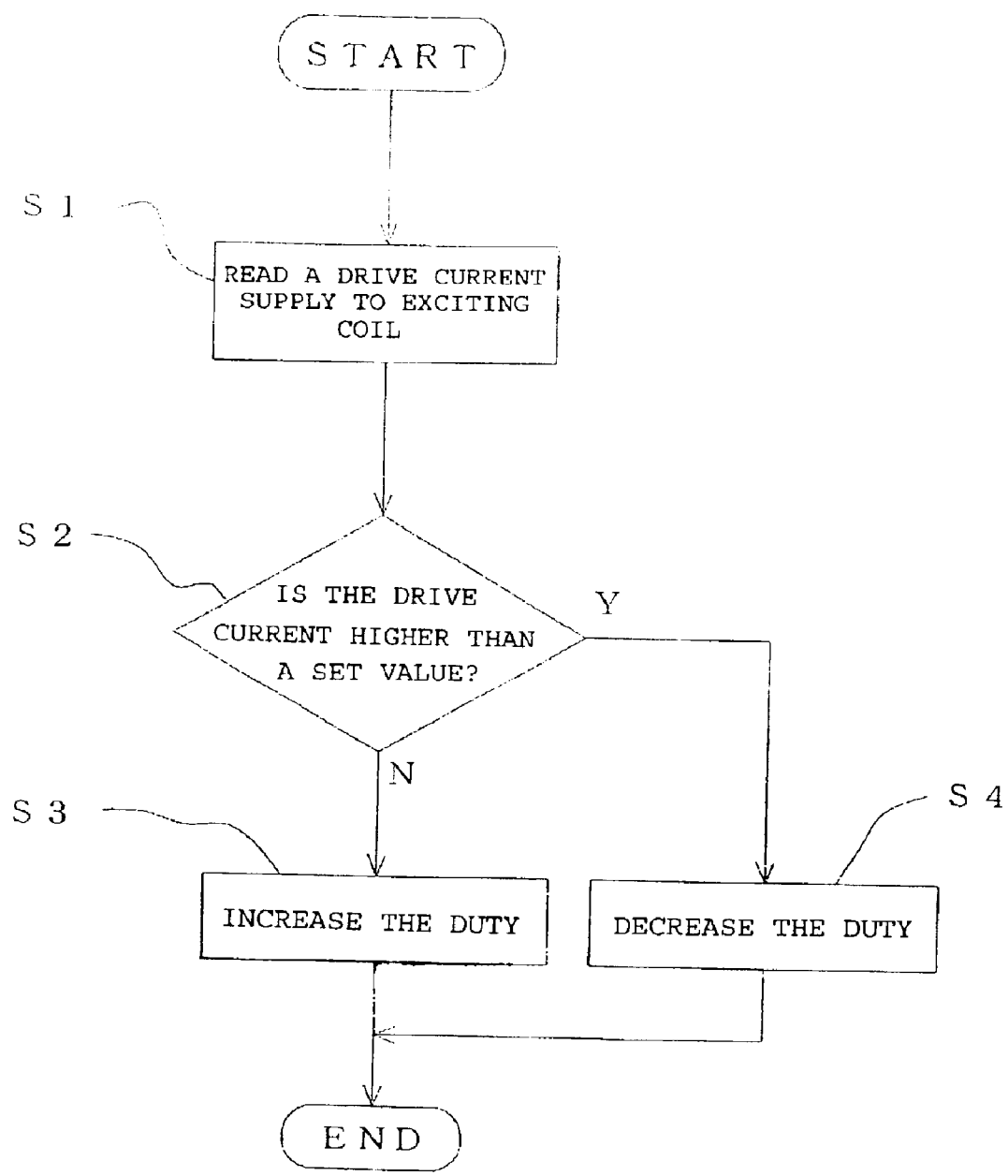
FIG. 8 is a flowchart showing the operation of the control unit.
Figure 9:
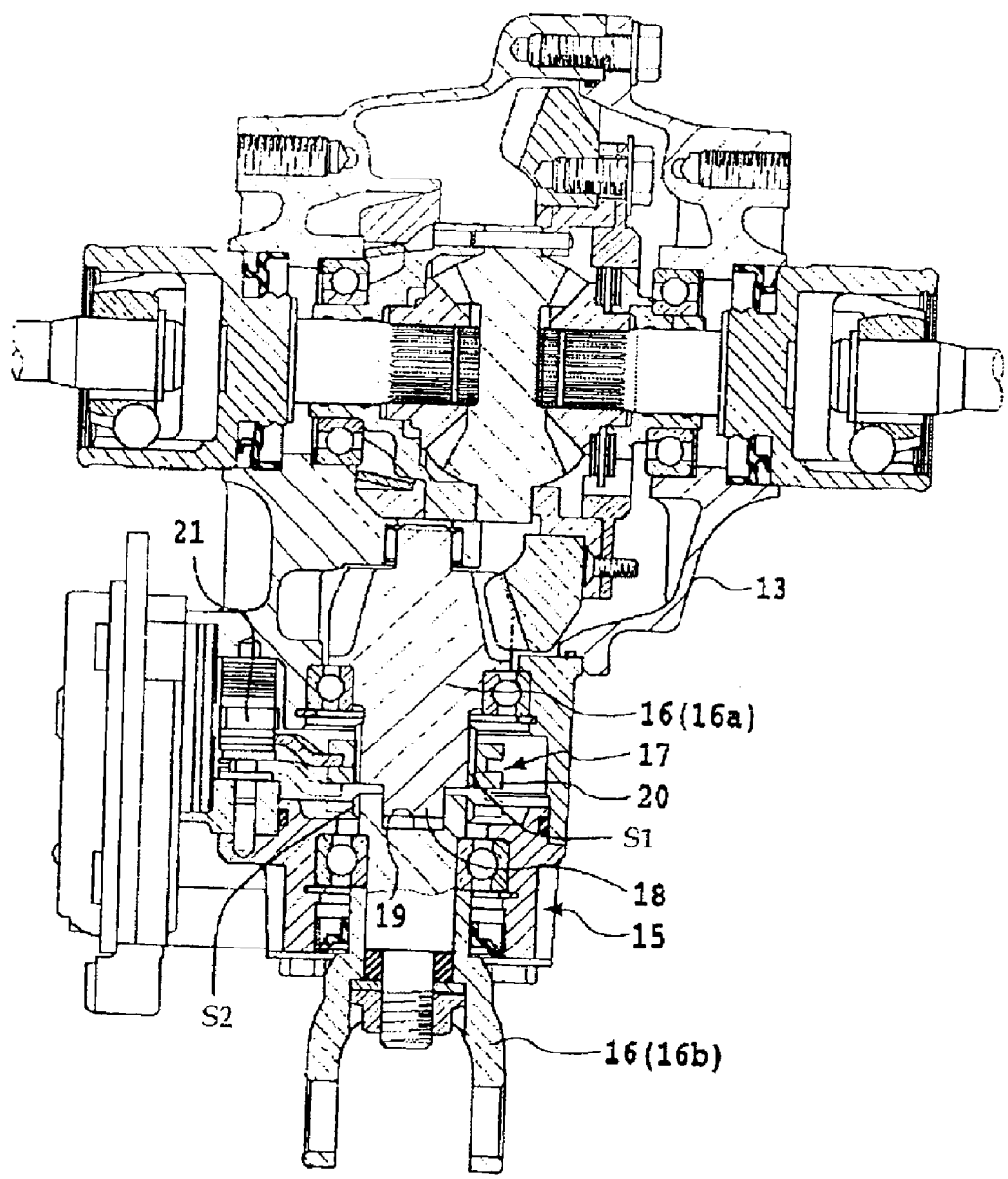
FIG. 9 is a sectional view of an essential part of a conventional two-wheel/four-wheel drive switching device.
Figure 10:
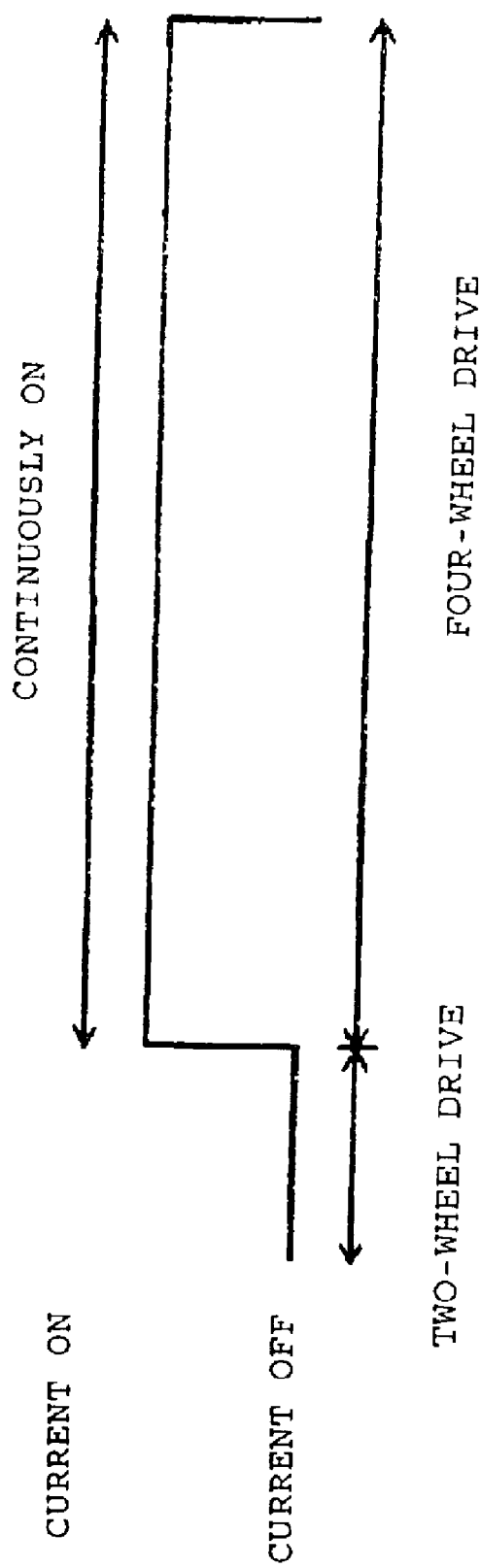
FIG. 10 is a waveform chart of a drive current supplied to the conventional two-wheel/four-wheel drive switching device shown in FIG. 9.

In the control unit 51, the drive current supplied to the exciting coil 49 is always detected by the current detecting means 65, and the detected drive current is fed back to the duty control means 64. FIG. 8 shows a flow of processing executed by the duty control means 64. After reading a drive current detected by the current detecting means 65 (step S1), it is determined whether or not the drive current detected is higher than a set value (step S2). If the drive current is higher than the set value, the duty ratio is decreased to thereby decrease the drive current (step S4), whereas if the drive current is lower than the set value, the duty ratio is increased to thereby increase the drive current (step S3).

Accordingly, the drive current is adjusted to the set value, thereby maintaining the clutch pressure in the electromagnetic clutch 47 in a stable condition.

The shape, size, etc. of each component described in this preferred embodiment are merely illustrative, and various modifications may be made according to design requirement or the like.

For example, the drive current control may be effected by adjusting a voltage applied to the exciting coil 49.

According to the present invention as described above, the drive current supplied to the switching unit constituting the two-wheel/four-wheel drive switching device is monitored, and the drive current is controlled to become a set value by performing variable duty control or by adjusting a voltage applied to the switching unit. Accordingly, a clutch pressure in the switching unit can be maintained at a constant value, thereby suppressing the generation of noise in the switching unit upon changing in operational condition of the vehicle.

Further, even when the drive current changes with a change in temperature of the switching unit, the control of the drive current can be effected automatically. Also in this respect, a change in the clutch pressure can be suppressed to thereby suppress the generation of noise. Moreover, the power consumption can be reduced to thereby allow a reduction in size of a generator and a battery mounted on the vehicle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A two-wheel/four-wheel drive switching device for a vehicle comprising:

a switching unit provided in either a power transmitting mechanism interposed between an engine and front wheels or a power transmitting mechanism interposed between said engine and rear wheels for switching between the continuation and interruption of power transmission in said power transmitting mechanism; and a control unit for controlling said switching unit, said control unit detecting a drive current supplied to said switching unit and performing variable duty control to maintain said drive current at a given value;

wherein the switching unit includes:
a drive shaft connected to an engine of the vehicle;
a driven shaft engaged with the drive shaft with an annular space defined therebetween;
a plurality of engaging members located in this annular space between the drive shaft and the driven shaft so as to disengageably engage the opposed surfaces of the drive shaft and the driven shaft;
a switching mechanism for selectively moving the engaging members between a position where the drive shaft and the driven shaft are connected with each other and a position where the drive shaft and the driven shaft are disconnected from each other;
a casing;
a cylindrical outer ring rotatably mounted in the casing so as to axially project from the casing toward the engine, the outer ring being axially divided into a first outer ring and a second outer ring, the second outer ring having one end connected via a spline and integrally rotatable to the first outer ring, and another end connected via another spline to the drive shaft; and
a cylindrical inner ring provided inside the outer ring, an inner circumferential surface of the inner ring being formed with a spline for connecting the driven shaft to the inner ring.

2. The two-wheel/four-wheel drive switching device according to claim 1, wherein the control unit comprises:

duty control means for controlling the drive current, the drive current for supplying an exciting coil of a clutch; and current detecting means for detecting the drive current, the duty control means performing said variable duty control of the drive current according to a detection signal from the current detecting means so that the drive current detected becomes said given value, said given value being determined according to an operational condition and a loaded condition of the engine.

3. The two-wheel/four-wheel drive switching device according to claim 2, wherein a transmission of power from the engine to one of the front wheels or the rear wheels is interrupted by cutting off the supply of the drive current to an exciting coil to thereby cancel the engagement of a retainer and the outer ring of the switching unit.

4. The two-wheel/four-wheel drive switching device according to claim 1, wherein the first outer ring and the second outer ring each have a larger diameter portion and a small diameter portion, the large diameter portions overlapping one end of a driven shaft of the vehicle.

5. The two-wheel/four-wheel drive switching device according to claim 1, wherein the engaging members are rollers.

6. A two-wheel/four-wheel drive switching device for a vehicle comprising:

a switching unit provided in either a power transmitting mechanism interposed between an engine and front wheels or a power transmitting mechanism interposed between said engine and rear wheels for switching between the continuation and interruption of power transmission in said power transmitting mechanism; and a control unit for controlling said switching unit, said control unit detecting a drive current supplied to said switching unit and controlling a voltage applied to said switching unit to maintain said drive current at a given value;

wherein the switching unit includes:
a drive shaft connected to an engine of the vehicle;
a driven shaft engaged with the drive shaft with an annular space defined therebetween;

a plurality of engaging members located in this annular space between the drive shaft and the driven shaft so as to disengageably engage the opposed surfaces of the drive shaft and the driven shaft;

a switching mechanism for selectively moving the engaging members between a position where the drive shaft and the driven shaft are connected with each other and a position where the drive shaft and the driven shaft are disconnected from each other;

a cylindrical outer ring rotatably mounted in the casing so as to axially project from the casing toward the engine, the outer ring being axially divided into a first outer ring and a second outer ring, the second outer ring having one end connected via a spline and integrally rotatable to the first outer ring, and another end connected via another spline to the drive shaft; and a cylindrical inner ring provided inside the outer ring, an inner circumferential surface of the inner ring being formed with a spline for connecting the driven shaft to the inner ring.

7. The two-wheel/four-wheel drive switching device according to claim 6, wherein the control unit comprises:

duty control means for controlling the voltage applied an exciting coil of a clutch of the switching unit; and current detecting means for detecting the drive current, the duty control means controlling the voltage according to a detection signal from the current detecting means so that the drive current detected becomes said given value, said given value being determined according to an operational condition and a loaded condition of the engine.

8. The two-wheel/four-wheel drive switching device according to claim 7, wherein a transmission of power from the engine to one of the front wheels or the rear wheels is interrupted by cutting off the supply of the drive current to an exciting coil to thereby cancel the engagement of a retainer and the outer ring of the switching unit.

9. A method for switching drive control of a vehicle between two-wheel drive mode and four-wheel drive mode comprising the steps of:

providing a switching unit in either a power transmitting mechanism interposed between an engine and front wheels or a power transmitting mechanism interposed between said engine and rear wheels for switching between the continuation and interruption of power transmission in said power transmitting mechanism, detecting the drive current by current detecting means, feeding the detected current to duty control means;

determining whether or not the detected drive current is higher than a given value;

performing variable duty control by decreasing the drive current to an exciting coil of a clutch if the drive current is higher than the given value, and decreasing the duty ratio to decrease the drive current to the exciting coil of the clutch if the drive current is lower than the given value, thereby adjusting the drive current to the given value in order to maintain a clutch pressure in a substantially stable conditions, wherein the switching unit includes:

a drive shaft connected to an engine of the vehicle;

a driven shaft engaged with the drive shaft with an annular space defined therebetween;

a plurality of engaging members located in this annular space between the drive shaft and the driven shaft so as to disengageably engage the opposed surfaces of the drive shaft and the driven shaft;

a switching mechanism for selectively moving the engaging members between a position where the drive shaft and the driven shaft are connected with each other and a position where the drive shaft and the driven shaft are disconnected from each other;

a casing;

a cylindrical outer ring rotatably mounted in the casing so as to axially project from the casing toward the engine, the outer ring being axially divided into a first outer ring and a second outer ring, the second outer ring having one end connected via a spline and integrally rotatable to the first outer ring, and another end connected via another spline to the drive shaft; and a cylindrical inner ring provided inside the outer ring, an inner circumferential surface of the inner ring being formed with a spline for connecting the driven shaft to the inner ring.

10. The method for switching drive control according to claim 9, wherein the drive current supplied to the exciting coil is always detected by said current detecting means.

11. The method for switching drive control according to claim 9, wherein said duty control means performs said variable duty control of the drive current according to a detection signal from said current detecting means so that the drive current detected becomes said given value, said given value being determined according to an operational condition and a loaded condition of the engine.

12. The method for switching drive control according to claim 11, wherein a transmission of power from the engine to one of the front wheels or the rear wheels is interrupted by cutting off the supply of the drive current to an exciting coil to thereby cancel the engagement of a retainer and the outer ring effected by the clutch.

* * * * *